US006907463B1

United States Patent
Kleinpeter III et al.

(10) Patent No.: US 6,907,463 B1
(45) Date of Patent: Jun. 14, 2005

(54) SYSTEM AND METHOD FOR ENABLING FILE TRANSFERS EXECUTED IN A NETWORK ENVIRONMENT BY A SOFTWARE PROGRAM

(75) Inventors: Thomas W. Kleinpeter III, Austin, TX (US); David C. McArthur, Austin, TX (US); Michael S. Merhej, Austin, TX (US)

(73) Assignee: AudioGalaxy, Inc., Austin, TX (US)

( * ) Notice: Subject to any disclaimer, the term of this patent is extended or adjusted under 35 U.S.C. 154(b) by 851 days.

(21) Appl. No.: 09/693,393

(22) Filed: Oct. 20, 2000

Related U.S. Application Data

(60) Provisional application No. 60/160,402, filed on Oct. 19, 1999.

(51) Int. Cl.[7] ............................................. G06F 15/16
(52) U.S. Cl. ........................ 709/228; 709/204; 709/231
(58) Field of Search ................................. 709/203, 204, 709/231, 227, 228, 212, 213; 707/10; 711/118; 714/18

(56) References Cited

U.S. PATENT DOCUMENTS

| | | | | |
|---|---|---|---|---|
| 5,864,854 A | * | 1/1999 | Boyle .......................... | 707/10 |
| 5,933,849 A | * | 8/1999 | Srbljic et al. ............... | 711/118 |
| 5,944,780 A | * | 8/1999 | Chase et al. ................ | 709/212 |
| 6,049,892 A | * | 4/2000 | Casagrande et al. ......... | 714/18 |
| 6,219,669 B1 | * | 4/2001 | Haff et al. .................... | 707/10 |
| 6,374,289 B2 | * | 4/2002 | Delaney et al. ............. | 709/203 |

FOREIGN PATENT DOCUMENTS

| | | | |
|---|---|---|---|
| EP | 0254854 A2 | * | 2/1988 |
| WO | WO 95/32573 A1 | * | 11/1995 |

* cited by examiner

*Primary Examiner*—Patrice Winder
(74) *Attorney, Agent, or Firm*—Gray Cary; Peter R. Leal

(57) ABSTRACT

The method of the present invention provides a means to exchange files between users in a network environment. This method includes the steps of first executing a software agent on a user's computing system. An additional copy or version of this software agent is executed on an additional user's computing system. These software agents establish a connection from their respective computing systems when their respective computing systems log in to the network environment and network based computing system. When this connection is made the status of their respective computing systems and availability of shared files is provided to an agent server. The agent server, executed on the network based computing system, directs the software agents to establish direct connection between their respective computing systems in response to file requests from various users.

18 Claims, 5 Drawing Sheets

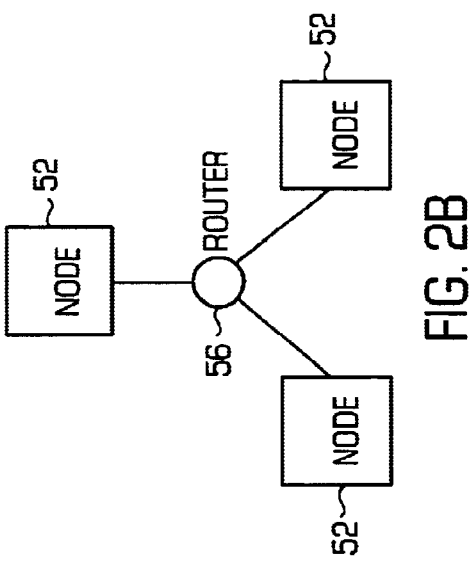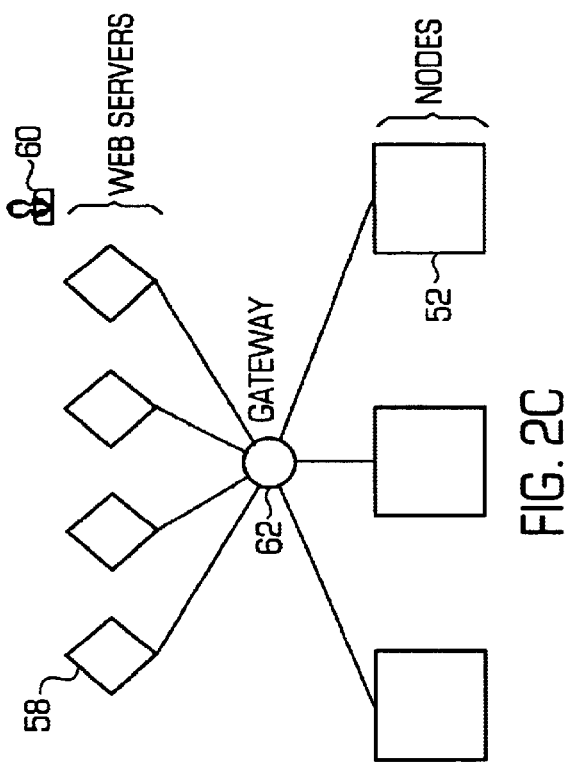

SYSTEM AND METHOD FOR ENABLING FILE TRANSFERS EXECUTED IN A NETWORK ENVIRONMENT BY A SOFTWARE PROGRAM

RELATED APPLICATION

This application claims the benefit of U.S. provisional application No. 60/160,402, filed on Oct. 19, 1999. Additionally, this application incorporates by reference the prior U.S. provisional application No. 60/160,402, filed on Oct. 19, 1999, entitled "Software Program and Methodology for Enabling File Transfer."

TECHNICAL FIELD OF THE INVENTION

This invention relates generally to the ability to share files and information in a network environment and, more particularly, to a system and method of sharing and transferring electronic files with an intelligent agent.

BACKGROUND OF THE INVENTION

The ability to share files and information online has developed into an uneven balance of supply and demand. An enormous demand exists for downloadable files on the Internet today. However, the supply is rather limited and not well organized. At the moment, users must connect to one source for listings of available files and then establish separate download connections with individual file servers. Operational file servers exist in limited numbers. Furthermore, each server can handle only a certain number of user connections at any given time. This has the effect of creating a bottleneck for the distribution of online information, yielding a congested, hassled, sluggish labor that grows larger and slower every day.

Additionally, in the context where a single server is the exclusive source of particular content, bandwidth constraints and requirements for that server are enormous. It would be desirable to reduce bandwidth requirements for these source servers and limit bandwidth considerations only to the location of the file; not the transfer of the exchanged files themselves.

It is also desirable that users be allowed to dynamically generate their own content and post this content to the network environment in real time.

SUMMARY OF THE INVENTION

The present invention provides a system and method for allowing individual users to exchange files. More specifically, the present invention provides a system and method for enabling file transfer between users in a network environment. The present invention provides a needed solution to the dismal state of network file transfer. This is accomplished by providing an intelligent, secure, web-based download agent that organizes numerous point-to-point connections between Internet users or network users all over the world.

According to the present invention, users of the intelligent agent provided by the present invention simply submit a list of requested files to a central web server. A database is accessed from which a list of available files and their locations is generated. The agent server organizes the requested files and matches them with the nearest available copy from the list of available files within the database. Alternatively, the agent server can match the request with the optimal delivery point. Finally, the agent server orchestrates a client server connection between the requesting user and the supplying user. This allows the requesting user and the supplying user to share information directly between one another. In the instance where a requested file is recognized but not currently available, then the agent server places that request in a queue until it becomes available. Similarly, if for some reason a connection with the client agent is lost at any point during the file transfer, the agent server will then queue the request until the user runs the agent server again. In this manner, it is possible that files partially downloaded from one source may be completed from another source. The identification of the nearest location or optimal connection is based on the network environment wherein connection speed, geographic location and other factors known to those skilled in the art are taken into account.

In this manner, the supply of files expands exponentially. Instead of depending on a single server or set of servers to provide files to the masses, every user becomes, in essence, a file server. Every download directly increases the availability of each file.

The present invention provides an important technical advantage in that users are spared the laborious task of personally searching for their files and are free to enjoy an automated, intelligent download service.

Another important technical advantage provided by the present invention is that transfers are extremely secure, as the agent server and associated software instructions only act on explicit instructions. These instructions may be encrypted with digital signatures to ensure that they cannot be forged. Therefore, the security of each user's computer is not compromised.

The present invention provides an important technical advantage over prior systems in that prior art systems typically provide a user with a list of available sources for a given file. In comparison, the present invention identifies the optimal source for retrieving that requested file. This source is based on the speed of the network connection between the client having that file locally stored and the geographic location, as well as other variables typically considered by those skilled in the art of network communications. Then, without any human intervention, the agent server provided by the present invention instructs the computer system of the user retaining the file in the computer system that is requesting the file how to transfer that file. In other words, without human intervention, a connection between the server and the client is made. In prior art systems, this was usually a very difficult, time-consuming process whereby one user explicitly defines a connection with a second user. The agent server of the present invention accurately and timely determines which users have the requested files, and which is the best potential connection to the requesting user.

Additionally, in the event that a file transfer is interrupted, the agent server of the present invention can determine what point in the file the transfer has been interrupted. Then instead of starting the file transfer process over with the same or an additional user maintaining that file, only the missing parts of that file need be transferred. Then the agent server of the present invention intelligently integrates these file components into the requested file.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein:

FIGS. 2A, 2B and 2C depict typical server architectures to be employed by the method of the present invention;

DETAILED DESCRIPTION OF THE INVENTION

Preferred embodiments of the present invention are illustrated in the FIGUREs, like numerals being used to refer to like and corresponding parts of various drawings.

The method of the present invention provides a means to exchange files between users in a network environment. This method includes the steps of first executing a software agent on a user's computing system. An additional copy or version of this software agent is executed on an additional user's computing system. These software agents establish a connection from their respective computing systems when their respective computing systems log in to the network environment and network based computing system. When this connection is made the status of their respective computing systems and availability of shared files is provided to an agent server. The agent server, executed on the network based computing system, directs the software agents to establish direct connection between their respective computing systems in response to file requests from various users.

Figure 1:
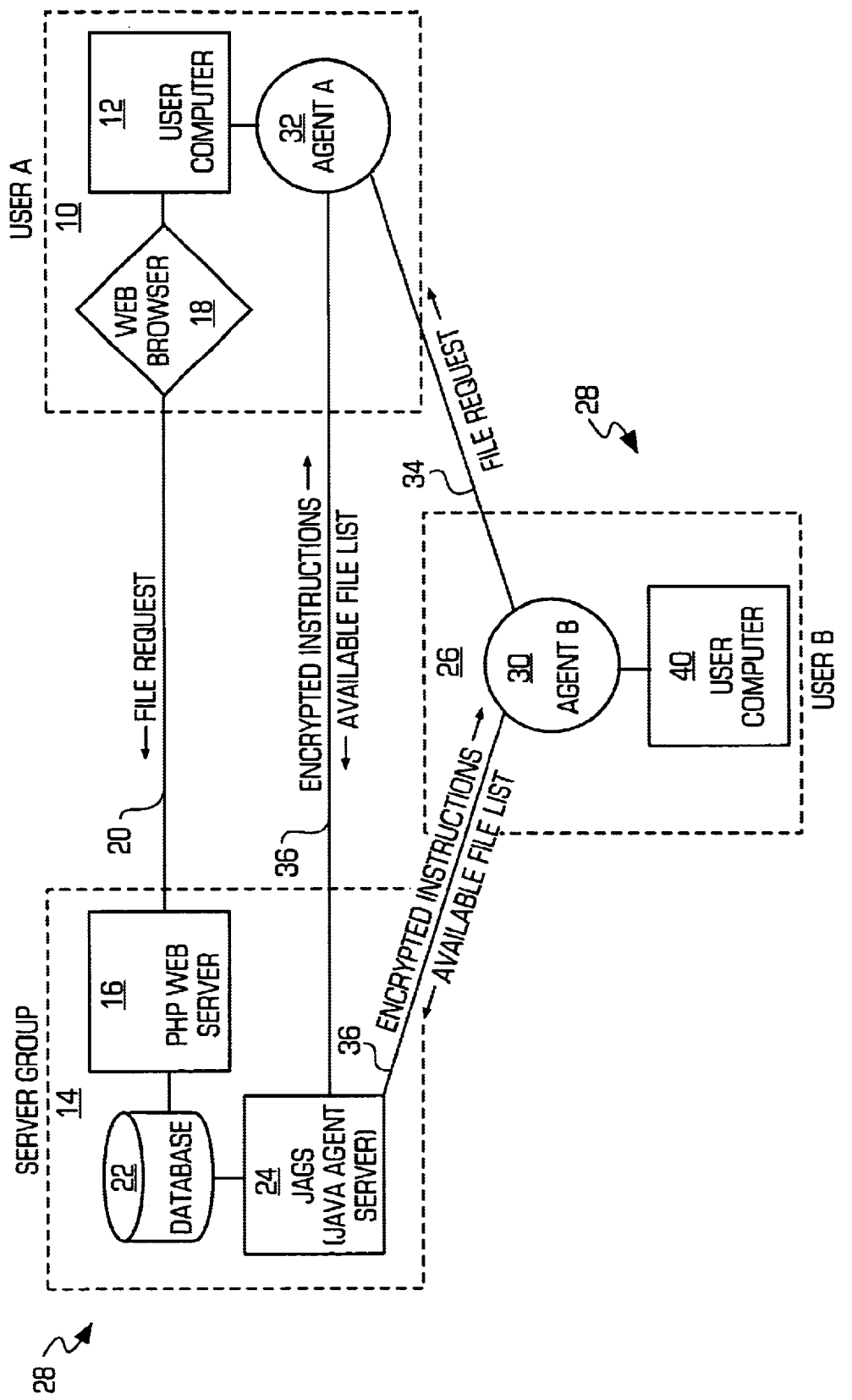
FIG. 1 illustrates the basic configuration of the present of the present invention.

The basic configuration of the present of the present invention is illustrated in FIG. 1. In FIG. 1, user 10 has determined that he wants a specific data file. User 10, through his user computer 12, logs onto agent server 14. This is accomplished by logging into a website maintained by web server 16 with web browser 18. A file request-or search 20 is run, following a request for this search submitted to agent server 14. Agent server 14 generates a list of available files from all files that have touched the database 22. This list is used to pick the appropriate user from which the file is requested.

Once received at the agent server 14, a Java agent server 24 selects a file from a list generated from all files that have touched database 22. In this manner, the status of all available files associated with users 10 that have logged on to agent server 14 are maintained within database 22. Java agent server 24 selects the appropriate file based on those users 10B that are currently attached to the network environment or Internet 28. Java agent server 24 may determine this by polling and creating an available file list from all users 10B logged in to network 28. Every time a user 10 logs on to network 28, the agent associated with the user sends an available file list to the Java agent server 24. Software located on server group 14 and Java agent server 24 has been designed to process file listings and account information to determine which users (clients) are connected to server group 14 and what files are available from those agents.

Upon receipt of a request 20 for a specific file, server group 20 processes the above-listed accounting information to determine which agent 30B is the best agent with which to establish connection 34 and transfer the appropriate file. Agent server 14 orchestrates the file transfer between agent 30A and agent 30B through a series of instructions 36 to agents 30A and 30B. All users 10A and 10B have uniquely-assigned IP addresses.

Server group 14 is representative of a group of servers, not just a single server, connected to a pair of users 10A and 10B. Additionally, server group 14 may be any type of digital memory management system known to those skilled in the art. Again, the overall function of server group 14 and the software instructions located therein is to identify which users are attached to network 28, what files those users have available. Optimal pathways from any given user 10A to any other given user 10B having the requested file are determined. Every time agent 30 located on user 10 is run, agent 30 logins to server group 14 and inform server group 14 of the available files located at user The actual request for a specific file is made through a web browser 18 connected to a web server 16 in the form of a file request 20. In other embodiments, it may be conceivable that a list of shared files is generated and presented to user 10 through web browser 18.

In some embodiments of the present invention, it is conceivable that server group 14 is not aware of available files unless, server group 14 pings or requests the available files from the logged in users 10. In other embodiments, agents 30 located at users 10 automatically login and inform server group 14 of their availability on the network and what files they currently have available to share within the network 28.

Java Agent 24, as to their specific roles in connection 34 instructs agents 30A and 30B. For example, agent 30A is given a specific IP address with which to connect, while agent 30B is informed to expect a request or a connection from a given IP address. Agents 30A and 30B located at users 10A and 10B, respectively, will perform a handshake operation to verify their identity before any constructive dialog or information is passed between these users. Then a determination is made on how and when to start the file transfer from user 10B to user 10A.

The reason that the present invention informs agents how to establish the connection between users 10A and user 10B is that in some instances an individual user 10 may be behind a firewall. In this instance, user 10 is unable to receive a connection inward or for some other reason may be unable to make a connection outward. In the instance of the present invention, instructions to agents 30A and 30B take this into account and determine which user 10A or 10B will establish connection 34. It is necessary to stress that who established the connection might not necessarily be the user receiving the file. Rather, the connection is made based on the individual circumstances of the individual users 10A and 10B.

Once connection 34 is made, connection 34 is a full duplex connection. That, in essence, means that data may be transferred in either direction from user 10A to user 10B. In a default configuration, where neither user 10A nor user 10B is behind a firewall or restricted in some other way for their connections, user 10A requesting the file will establish the connection with user 10B. The present invention need not be limited to this default configuration. Rather, this default configuration was chosen as a matter of convenience. Once connection 34 is established, information or data may be transferred in either direction along connection 34. There may be instances where both users are behind a firewall or other communication protocol preventing users from proceeding with the file transfer. However, in these instances, these users are not matched.

The instructions from server group 14 to individual agents 30A and 30B need not be encrypted for security purposes. As these are direct instructions sent from one IP to another, they are available only to the designated parties.

In essence, the present invention identifies the set of available files belonging to a collective of users. Each available file is assigned a unique identification and logged within database 22. This eases the processing and identification of matching requested files via file request 20 to the available file list from users 10B connected to network 28.

Another use for the method of the present invention is the possibility of remotely executing a file 38 located on user 10B's user computer 40.

It should also be noted that web browser 18 need not be executed from user computer 12. Rather, user 10, having agent 30 operating on user computer 12, may identify himself via a remote web browser 18 located on or executed on a different computer. User 10 is capable of identifying his home computer and requesting that the file transfer be made from another user 10B to user 10's native user computer 12.

When a user 10 runs agent program 30 for the first time, an account is set up for user 10. The steps involved are the download or loading of agent 30 onto user computer 12. When the agent program 30 is executed, the following information is collected about user 10A to include the agent name, email address, a password, and a directory of files to be shared by user 10A with the other users 10B accessing server group 14 via network 28. This data may be gathered through a graphical user interface or other means.

After the information on user 10 is collected, agent 30 establishes a connection with server group 14 to complete the account sign-up process. This involves the actual establishment of a connection from agent 30 to server group 14 and determination of the local IP address of agent 30. This local IP address may be either static or dynamic. In the case of the latter, the unique IP address of agent 30 is supplied and returned to server group 14 every time agent program 30 is executed on user computer 12. Server group 14 compares the IP address provided by agent 30 with the IP address of the connection. If the IP addresses differ, then agent 30 is assumed to be behind a proxy server. If this is the case, then agent 30 will always be active. If the IP addresses are the same, the server will attempt to establish a connection with agent 30. To do so, server group 14 sends agent 30 the number of a port to open. Once agent 30 has opened the port, agent 30 notifies server group 14 that the port is open. Then server group 14 attempts to establish a connection on the new port. If it is possible for server group 14 to connect, then the agent is either active or passive. Otherwise, agent 30 will always be active. After the agent type (active or passive) has been determined, server group 14 tests the speed of agent 30 by sending several packets. Agent 30 replies with a packet upon receipt. In this way, the actual transfer speed of the connection between server group 14 and agent 30 is determined rather than a default reported speed. This allows the file transfers to be achieved at the highest actual data rate rather than an expected data rate. Again, server group 14 measuring the average round-trip time of the packet determines the data rate.

After these tests have been completed, server group 14 will create a set of DSA keys and provide the public key to the client or agent 30. Server group 14 provides agent 30 with an agent ID number and initial values to use for settings in the client. Next, the client will disconnect until needed again, at which time the client will log back in normally.

Another important aspect of the present invention is the ability of server group 14 to determine the optimal pair of agents 30A and 30B with which to establish a connection for an individual file transfer. This ability frees users 10 from dealing with the identification of specific sites and the establishment of the appropriate protocols for file transfers between those sites. This is achieved by server group 14 intelligently matching a list of server agents 30A and 30B that have the requested files and are currently connected to network 28. Agents 30 that are no longer connected to network 28 are eliminated, as well as agents 30 that have already attempted and failed to exchange the same file with user 10.

Another decision point examined in the file transfer process is the determination of whether an agent has a firewall associated with that user. If the user is behind a firewall, then that user may be matched only with an agent not located behind a firewall. Agents not located behind firewalls can be matched with agents no matter what their firewall association is, but agents not behind firewalls are matched with agents behind firewalls first.

Next, a geographic check is made as to whether or not agents in the list share the same sub-net, network, or non-USA country code. If no matches are made, then the connection is made based purely on the fastest speed connection with the lowest current load. Additionally, a list of matching agents may be cached to help speed up the file transfer in the event that an agent is unable to complete a file exchange.

After the appropriate file serving agent 30 has been identified, server group 14 informs agents 30 and 30B to establish a connection with one another with a series of instructions as to how that connection is to be established.

The present invention provides an additional advantage in that server group 14 does not maintain a copy of all the files to be transferred between various users 10. Rather, database 22 merely retains an accounting of the different files that have been presented to server group 14 and IDs associated with those files. Database 22 provides a look-up file, rather than an actual copy of all files to be shared between users. Some embodiments of the present invention remember all files that have been seen by server group 14, regardless of whether or not these files have been deleted by the individual users. Therefore, a record of what files have been made available with this method of sharing files is provided.

Connection 34 between agents 30A and 30B and their host computers 12 and 40 are connections that are only open when directed by server group 14. Connection between agents 30A and 30B and server group 14 is opened and remains open as long as agents 30A and 30B are running and their host computer systems are connected to network 28. This provides more security in that the connections between individual users are only open when needed and do not remain open any longer. Furthermore, these connections 34 are constructed so that they will automatically close if unexpected data is transferred between agents 30A and 30B. The pathway between server group 14 and agents 30A and 30B enable server group 14 to maintain a dynamic listing of the files available between various users 10 utilizing the methods of the present invention.

One of the key aspects provided by the present invention is the concept of agent matching, wherein server group 14 determines the optimal repository user from which user 10A may receive a requested data file from user 10B. This ability frees individuals users 10 from dealing with and looking through specific sites. To achieve this, server group 14 maintains a list of the active agents 30A and 30B logged in to network 28 that have files and are currently available. Agents that have failed to exchange the same file with a client, or who are no longer connected, are eliminated from the list of potential matches for a given request 20. In the case where an agent is located behind a firewall, an appropriate agent is chosen so that the handicap of the firewall preventing the establishment of a connection in one way can be overcome.

Another advantage provided by the present invention is that in a transfer between two agents 30A and 30B, one agent is passive while the other is active. This means that one of the agents is serving as a client while the other as a server. For the connection modes, an active agent is defined as the agent that establishes the connection, while the passive agent opens a port and waits for the active agent to connect. In the transfer modes, the client agent requests a file once a connection is open, while the server agent sends the file once a client agent has requested it. These distinctions are made because some agents are behind firewalls and can only establish connections. For example, if agent 30A wants a file held by agent 30B and agent 30A is behind a firewall, agent 30B must be instructed to establish the connection by server group 14. After the connection is open, agent 30A can then request the file to be supplied-by agent 30B. In this case, agent 30B is an active server while agent 30A is a passive client.

FIGS. 2A, 2B and 2C depict typical server architectures to be employed by the method of the present invention. FIG. 2A depicts one such embodiment where server group 14 is composed of a cluster of servers and several special software programs that link the servers together. The backbone of this system is a software component called a node 52. Each node is capable of dealing with several thousand clients 54 simultaneously. Node 52 maintains a list of files and information about current and pending transfers for each client 54. When a node 52 receives a request from client 54, node 52 communicates to other nodes 52 to find which clients 54 have the requested file. A program called a router 56, as depicted in FIG. 2B handles communication between nodes 52. All nodes 52 connect to router 56 and exchange messages through router 56.

Upon receiving a message from node 52, router 56 either sends the message to a specific node 52 or broadcasts this message to all nodes 52. For example, when a node 52 has been instructed to find all the locations of a particular file, router 56 sends a broadcast message to all nodes 52. Thus, all nodes 52 are queried for the requested file. The discussion of the interactions between client nodes and routers, as depicted in FIGS. 2A and 2B, is transparent to the typical user. Most user interaction occurs through a website 58, as depicted in FIG. 2C.

Users 60 desire information stored on various nodes 52. In order to be displayed on a web page within a web browser handled by web server 58; the information must be provided to web server 58. This is accomplished through the use of a software gateway 62. Software gateway 62 serves to transfer and format data between nodes 52 and web servers 58. When a user desires a file, a message is sent from web server 58 requesting the specific piece of information. This request is routed through gateway 62 to nodes 52. Upon receiving a response from the specific node 52, gateway 62 relays the appropriate information to the correct web server 58. This architecture simplifies the programming, as there is only one place to connect to retrieve the desired information.

Gateway 62 also may store frequently accessed information at a local level. This has the added benefit of increasing bandwidth and decreasing download time. For example, the two most frequent queries from web servers 58 are the locations of specific files held by various clients 54 and whether or not a specific client 54 is active. If this information is stored at gateway 62, whenever a client logs in or off, the appropriate file list is added or removed from the information contained at gateway 62. Storing this data in this manner allows for much faster response times.

Security is another important feature provided by the file transfer methodology of the present invention. In order for a client 54 to be connected to an individual user 60, clients 54 are instructed what to do before allowing connections from remote programs. These instructions may or may not be encrypted for security purposes. This allows client 54 to function without continually listening for a network connection. Rather, client 54 need only listen for the few seconds between when server group 14 informs client 54 to listen and when the remote client connects. Once the remote client has connected, if either machine asks for a file other than what server group 14 instructed them to transfer, the machines are automatically disconnected. This is a great advantage over prior systems where continually listening for a connection can raise security issues as unexpected programs can access and execute files on a client's computer.

After a search has been performed that determines the optimal client from which the transferred file should be received, passive client 54B is instructed to open a port and active client 54A is told to connect to passive client 54B at a specific address according to a specific set of instructions. These events must occur in order. If the port is not open when the active client 54A tries to connect, a problem exists. To enforce this order, a token may be used and passed around the network in the proper order. The token is not passed until the clients are ready to proceed, and an action will not be performed until the token is received.

Figure 3A:
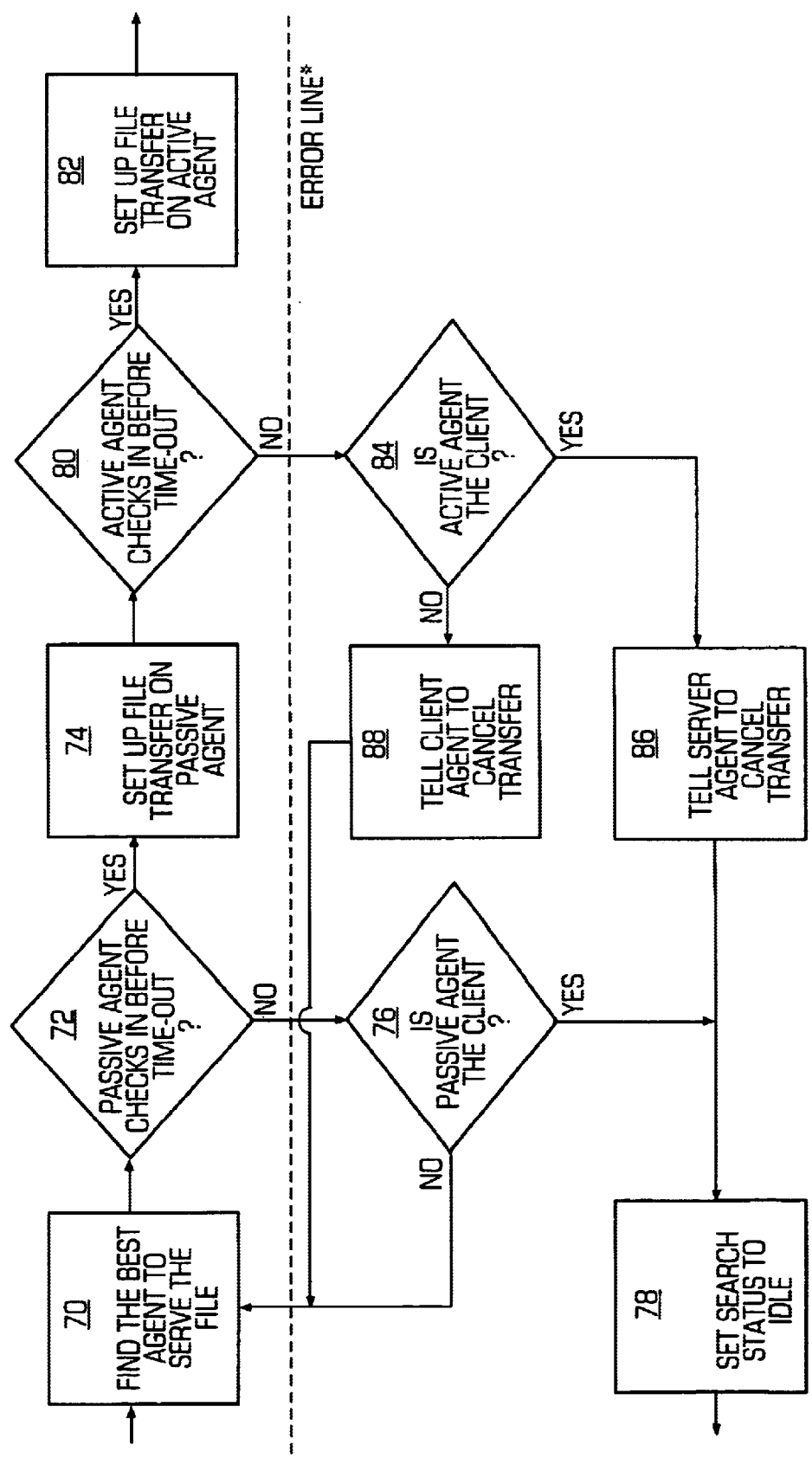
FIGS. 3A and 3B illustrate one possible embodiment of the file transfer setup and the results of a transfer set up in this manner.

FIG. 3A illustrates one possible embodiment of the file transfer setup. If all goes well, passive agent 54B will check in and be told to allow a connection from active agent 54A. Active agent 54A checks in and is instructed to initiate connection 34. Key issues here are that if the expected agent 54A requesting the file does not check in, the search is delayed or placed in stasis until the appropriate client agent reconnects. If the agent that has the file does not connect, an alternative user or agent must be located.

The process illustrated in FIG. 3A is relatively simple, except when complicated by the need to instruct an agent to cancel the search. At step 70, server group 14 finds the best agent to serve the file. At decision point 72, passive agent checks in before a security time out. If this check-in is made, then at step 74 a setup for the file transfer on the passive agent is made. If not, a determination is made as to whether the passive agent is the client. If not, a search for the best agent to serve the requested file is repeated in step 70. If at decision point 76 the passive agent is the client, the search status is set to idle and end point 78.

Following the setup of file transfer on passive agent 74, the status of active agents checking in is made at decision point 80. If the active agent checks in at decision 80, the file transfer is set up in step 82 on the active agent. Otherwise, a determination is made at decision point 84 as to whether or not the active agent is the client. If the active agent is the client at decision point 84, the server agent is instructed to cancel the transfer at step 86 and set the search to an idle status. Otherwise, the client agent is told to cancel the transfer at step 88 and return to repeat the search of step 70 to locate the best agent according to a new search.

Figure 3B:
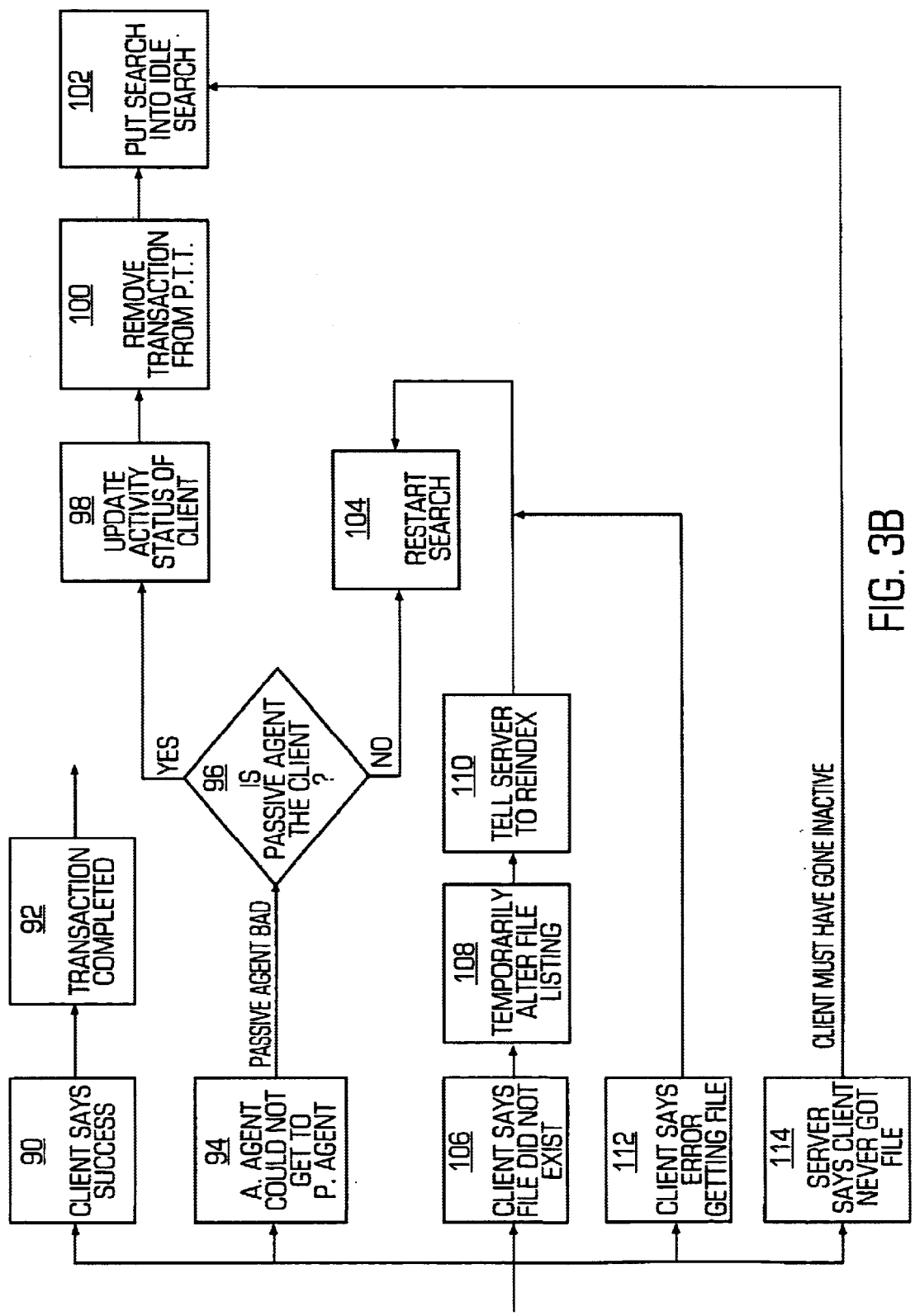

FIG. 3B depicts the results of a file transfer whose setup was depicted in FIG. 3A. Several different results can occur. For example, at result 90, a client may say the transfer was successful, in which case the transaction is completed at point 92. However, in result 94, the active agent depicted could not communicate with the passive agent. If the passive agent was bad, as determined at decision point 96, an update activity of the client is made in step 98 and this transaction is removed from the PTT in step 100 and the search is placed in an idle status at step 102. If the passive agent was not bad at decision point 96, the search is re-started at step 104.

Another result may occur when the client says the file did not exist, as illustrated in step 106. This may result in temporarily altering the file listing in step 108 and instructing server group 14 to re-index at step 110, in which case the search is re-started.

Another result is reported in result 112, where a client reports an error in receiving the requested file. This may result in a repeat of the search at step 104 wherein the requested file is located by re-starting the search at step 104.

In result 114, the server reports that the client never received the file. For this to happen, the client serving the file must have entered an inactive status. Thus, the search is put into an idle status at step 102.

Another feature associated with the present invention is that server group 14 maintains a pool of threads available at all times for connections. In other words, the connections are multi-threaded. Each thread keeps a connection to the database open to ensure that agents can check in very quickly. There are also background threads running that clean up expired transactions and retry searches that were not matched.

Figure 4A:
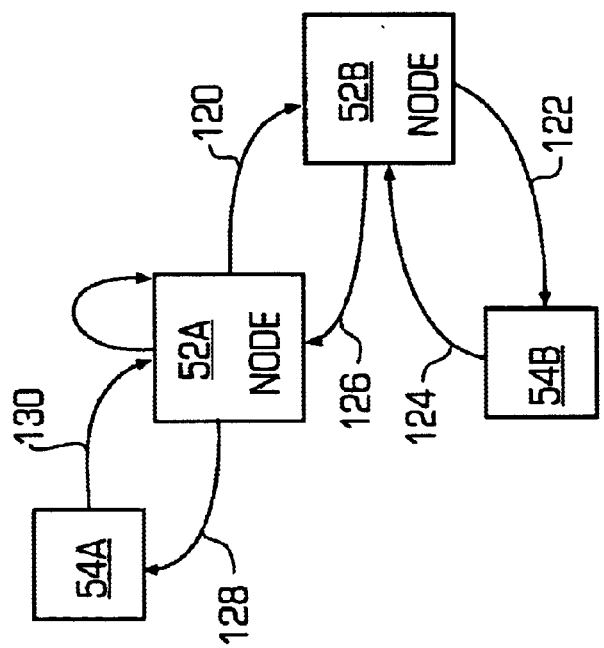
FIGS. 4A and 4B illustrate other methods of setting up file transfers and their results.
Figure 4B:
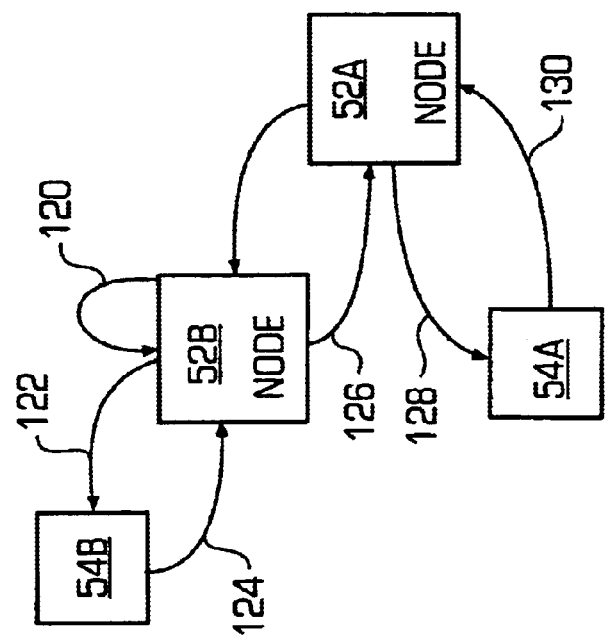

Other methods of setting up file transfers and their results are illustrated in FIGS. 4A and 4B. After a node 52 has completed a search and determined the best client 54 from which to transfer a file, passive client 54B is instructed to open a port and await a communication from active client 54A. Active client 54A is simultaneously instructed on how to connect to passive client 54B. These events must occur in order. If the port is not open when active client 54A attempts a connection, there will be an error.

FIG. 4A illustrates the case where the client that wants the file is chosen as the passive client 54B. The diagram provided in FIG. 4A describes this process: First, message 120 is sent to the passive client's node. Next, on receipt, node 52 sends message 122 to passive client 54B. In this case, as the client is the passive client, the passive client's node is sending the message to passive client 54B desiring the file. This message instructs passive client 54B to open an appropriate port and send message 124 back to the node 52B. Node 52B, the passive client's node, then notifies the active client's node 52A at step 126. Active client node 52A then sends message 128 to active client 54A. Again, active client 54A in this instance is the client that has the file. Active client 54A attempts to connect to passive client 54B and sends a status report 130 to node 52A. Upon receiving status report 130, active client's node 52A sends the status back to passive client 54B.

An alternate transfer is illustrated in FIG. 4B, where the client requesting the file is the active client and the client having the file is the passive client. In this case, a message 120 is sent from the active client's node 52A to the passive client's node 52b. On receipt, node 52B provides message 122 to passive client 54B. Message 122 instructs passive client 54B to open the appropriate port and report back to node 52B in message 124. Node 52B then reports to node 52A with message 126 indicating the status of passive client 54B. Active client node 52A sends message 128 to active client 54A. Message 128 instructs active client 54A how to open a connection with passive client 54B. Active client 54B will attempt to connect to passive client 54B and will send back status report 130. Upon receiving status report 130, active client node 52A sends the report back to client 54 requesting the file. This client depends on which client was chosen as the active and which was chosen as the passive client, based on firewall status.

Any problems existing during the setup will cause a message to be sent to both clients 54A and 54B instructing them to abort the transfer. The message is then sent to the node of the client requesting the file. Upon receiving that message, the node of the client requesting the file will then pick the next best match and re-start the process.

Again, it is important to emphasize the added security provided by the present invention. Security is a primary concern for any network system. It is especially important in the case where the agents have the ability to read and write files. To ensure that the system is not compromised, instructions from server group 14 may use digital signatures to verify their authenticity. Additionally, when an agent first connects to the system, a public/private key pair can be generated for that agent. The public key may be transmitted to the agent and the private key is kept within the server group database. This key may be used with a digital signature for verification of each instruction.

An added feature of the architecture of the present invention makes it difficult to infiltrate the system. Agents only act on instructions from the server, and the agent always initiates the connection to the server. Therefore, agent only open ports when instructed to do so by the server, and the agent that connects to the port must request exactly the right file or nothing will be transmitted.

It is important to note that agent server 14 accomplishes the act of mending files received from. disparate file transfers into a single file. Agent server 14 can request that the file be sent at a specific position in the file transfer process. Then the first received portion of the file and the latter receiver portion or portions may be mended together to form the single unitary requested file.

The following table contains a glossary of terms used within the present invention:

| Term | Description |
| --- | --- |
| Active Agent | An agent in active mode. The active agent initiates the connection to an agent in passive mode. |
| Active Mode | One of two connection modes assigned to an agent when it is picked to exchange a file. (See Connection Modes, Active Agent) |
| Agent Modes | In a transfer between two agents, each agent is assigned a connection mode and a transfer mode. |
| Agent Server | Centralized server that coordinates a network of file agents, and instructs them to exchange files between one another. Users request files using a web-based interface written in PHP. The server uses a database to maintain the state of all-current exchanges and agents. |
| File Agent (AFA) | A program that receives instruction from the Agent Server, and exchanges files with other agents. |
| Client Agent | An agent in client mode. The client agent receives the file from an agent in server mode. |
| Client Mode | One of two transfer modes assigned to an agent when it is picked to exchange a file. (See Connection Modes, Client Agent) |
| Connection Modes | When two agents attempt to exchange a file, one of them must initiate the connection. The agent in active mode initiates the connection, and the agent in passive mode waits for a connection. |
| Digital Signature | An encrypted message sent along with sensitive data, used by the receiver to verify the authenticity of the sender. |

-continued

| Term | Description |
|---|---|
| Passive Agent | An agent in passive mode. The passive agent waits for a connection from an agent in active mode. |
| Passive Mode | One of two connection modes assigned to an agent when it is picked to exchange a file. (See Connection Modes, Passive Agent) |
| PHP | An HTML-embedded scripting language. Much of PHP's syntax is borrowed from C, Java and Perl with a couple of unique PHP-specific features thrown in. The goal of the language is to allow web developers to write dynamically generated pages quickly. |
| Server Agent | An agent in server mode. The server agent sends the file to an agent in client mode. |
| Server Mode | One of two transfer modes assigned to an agent when it is picked to exchange a file. (See Connection Modes, Server Agent) |
| Transfer Modes | When two agents attempt to exchange a file, one agent sends the file and the other agent receives it. The agent in client mode receives the file, and the agent in server mode sends the file. |

The present invention provides an important technical advantage over prior systems in that prior art systems typically provide a user with a list of available sources for a given file. In comparison, the present invention identifies the optimal source for retrieving that requested file. This source is based on the speed of the network connection between the client having that file locally stored and the geographic location, as well as other variables typically considered by those skilled in the art of network communications. Then, without any human intervention, the agent server provided by the present invention instructs the computer system of the user retaining the file in the computer system that is requesting the file how to transfer that file. In other words, without human intervention, a connection between the server and the client is made. In prior art systems, this was usually a very difficult, time-consuming process whereby one user explicitly defines a connection with a second user. The agent server of the present invention accurately and timely determines which users have the requested files, and which is the best potential connection to the requesting user.

Additionally, in the event that a file transfer is interrupted, the agent server of the present invention can determine what point in the file the transfer has been interrupted. Then instead of starting the file transfer process over with the same or an additional user maintaining that file, only the missing parts of that file need be transferred. Then the agent server of the present invention intelligently integrates these file components into the requested file.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A system for exchanging files in a network environment, comprising:

a first software agent executing on a first user's computing system;

at least one additional software agent executing on at least one additional user's computing system; and an agent server to which said first software agent and said at least one additional software agent establish a connection when said first user's and said at least one additional user's computing systems log in to said network environment, wherein said agent server directs said first software agent and said at least one additional software agent to establish a direct connection between said first user's and one of said at least one additional user's computing systems when files are to be shared between said first user's and said one of said at least one of additional user's computing systems, and wherein said agent server directs said first software agent and said at least one additional software agent based on at least one criterion.

2. The system for exchanging files in a network environment of claim 1, wherein said agent server directs said first software agent and said at least one additional software agent to establish a direct connection between said first user's and said one of said at least one additional user's computing systems in response to a file request from said first software agent and wherein said at least one additional software agent is directed to send said requested file directly to said first software agent.

3. The system for exchanging files in a network environment of claim 1, wherein said agent server directs said first software agent and said at least one additional software agent based on firewall type, subnet, network or non-USA country code, and/or connection speed in order to minimize file transfer time between said first software agent and said at least one additional software agent.

4. The system for exchanging files in a network environment of claim 3, wherein said agent server directs said at least one additional user's software agent to open a port on said at least one additional user's computing system to listen for a connection and file request from said first user's computing systems, and directs said first user's computing system to connect to said at least one additional user's computer system.

5. The system for exchanging files in a network environment of claim 1, wherein said agent server directs said first user's software agent to open a port on said first user's computing system to listen for a connection and file request from said at least one additional user's computing systems, and directs said at least one additional user's computing system to connect to said first user's computer system.

6. The system for exchanging files in a network environment of claim 5, wherein if said first user's computing system receives an unexpected connection attempt or file request/transfer said open port is closed.

7. The system for exchanging files in a network environment of claim 5, wherein if said at least one additional user's computing system receives an unexpected connection attempt or file request/transfer said open port is closed.

8. The system for exchanging files in a network environment of claim 1, wherein said network environment is an Internet.

9. The system for exchanging files in a network environment of claim 1, wherein said first user's computing system serves as a client and said at least one additional computing system serves as a server to exchange said requested files.

10. The system for exchanging files in a network environment of claim 1, wherein said first user's computing system serves as a server and said at least one additional computing system serves as a client to exchange said requested files.

11. The system for exchanging files in a network environment of claim 1, wherein said first user makes said file request via a GUI linked to a web server coupled to server system operable to execute said agent server.

12. A method of exchanging files between users comprising the steps of:
executing a first software agent on a first user's computing system;
executing at least one additional software agent on at least one additional users computing system; and
executing an agent server on a network based computing system;
establishing a connection from said agent server to said first software agent and said at least one additional software agent when said first user's and said at least one additional user's computing systems log in to said network environment;
directing said first software agent and said at least one additional software agent to establish a direct connection between said first user's and one of said at least one additional user's computing systems when files are to be shared between said first user's and said one of said at least one of additional user's computing systems, and wherein directing said first software agent and said at least one additional software agent is based on at least one criterion.

13. The method of claim 12, further comprising
requesting a file, wherein a file request is sent from said first software agent; and
sending the requested file directly from said at least one additional software agent to said first software agent.

14. The method of claim 12, wherein directing said first software agent and said at least one additional software agent is based on firewall type, subnet, network or non-USA country code, and/or connection speed in order to minimize file transfer time between said first software agent and said at least one additional software agent.

15. The method of claim 12, wherein said agent server directs said first user's software agent to open a port on said first user's computing system to listen for a connection and file request from said at least one additional user's computing systems, and directs said at least one additional user's computing system to connect to said first user's computer system.

16. The method of claim 12, wherein said agent server directs said at least one additional user's software agent to open a port on said at least one additional user's computing system to listen for a connection and file request from said first user's computing systems, and directs said first user's computing system to connect to said at least one additional user's computer system.

17. The method of claim 16, wherein if said at least one additional user's computing system receives an unexpected connection attempt or file request/transfer said open port is closed.

18. A system for exchanging files in a network environment, comprising:
a first software agent executed on a first user's computing system, wherein said first user makes a file request via a GUI linked to a web server coupled to server system;
at least one additional software agent executing on at least one additional users computing system; and
an agent server, executed on said server system, to which said first software agent and said at least one additional software agent establish a connection when said first user's and said at least one additional user's computing systems log in to said network environment, and wherein said agent server directs said first software agent and said at least one additional software agent to establish a direct connection between said first user's and one of said at least one additional user's computing systems when files are to be shared between said first user's and said one of said at least one additional user's computing systems, and wherein said agent server receives a list of available files to be shared from said first user's and said at least one additional user's computing systems when said first user's and said at least one additional user's computing systems log in to said network environment, and wherein when said agent server receives a file request from said first user, said agent server matches said request to at least one additional software agent having said requested file, and wherein directing said first software agent and said at least one additional software agent is based on firewall type, subnet, network or non-USA country code, and/or connection speed in order to minimize file transfer time between said first software agent and said at least one additional software agent.

* * * * *